United States Patent [19]

Veyriere

[11] Patent Number: 4,459,029

[45] Date of Patent: Jul. 10, 1984

[54] DEVICE FOR MIXING AND FOR DOSE-FEEDING A PRODUCT, AND APPLICATION TO FEEDING ESPECIALLY EPOXY-RESIN BASED ADHESIVES

[75] Inventor: Pierre Veyriere, Souillae, France

[73] Assignee: Etablissements G. Pivaudran, S.A.R.L., Souillae, France

[21] Appl. No.: 455,799

[22] Filed: Jan. 5, 1983

[30] Foreign Application Priority Data

Jan. 6, 1982 [FR] France .................... 82 00326

[51] Int. Cl.$^3$ ............................. B01F 15/02
[52] U.S. Cl. .................... 366/179; 366/182; 366/189; 366/192; 366/332; 422/112; 422/114; 422/224
[58] Field of Search ............... 222/137, 145, 504, 510; 366/132, 134, 148, 152, 153, 162, 163, 177, 179, 181, 182, 183, 189, 192, 241, 255, 256, 260, 280, 332, 338, 339; 422/112, 114, 133, 224

[56] References Cited

U.S. PATENT DOCUMENTS 3,999,740 12/1976 McCorvey ...................... 366/179
4,053,283 10/1977 Schneider ....................... 366/179

*Primary Examiner*—Philip R. Coe
*Assistant Examiner*—Arthur D. Dahlberg
*Attorney, Agent, or Firm*—Harold H. Dutton, Jr.

[57] ABSTRACT

The invention concerns a device for mixing and dose feeding a product of one or several components.

This device comprises a mixing chamber 3 within which is freely mounted a static-type mixing member 7 which thereby can move within the chamber 3 along a predetermined path; this member is associated with return means 9 arranged to repel it in the direction $S_2$ from the discharge toward the inlets of the chamber; when in motion during the product feed operation, the member 7 permits projecting product doses with high accuracy and without dispersion while also achieving thorough mixing of the product components.

11 Claims, 8 Drawing Figures

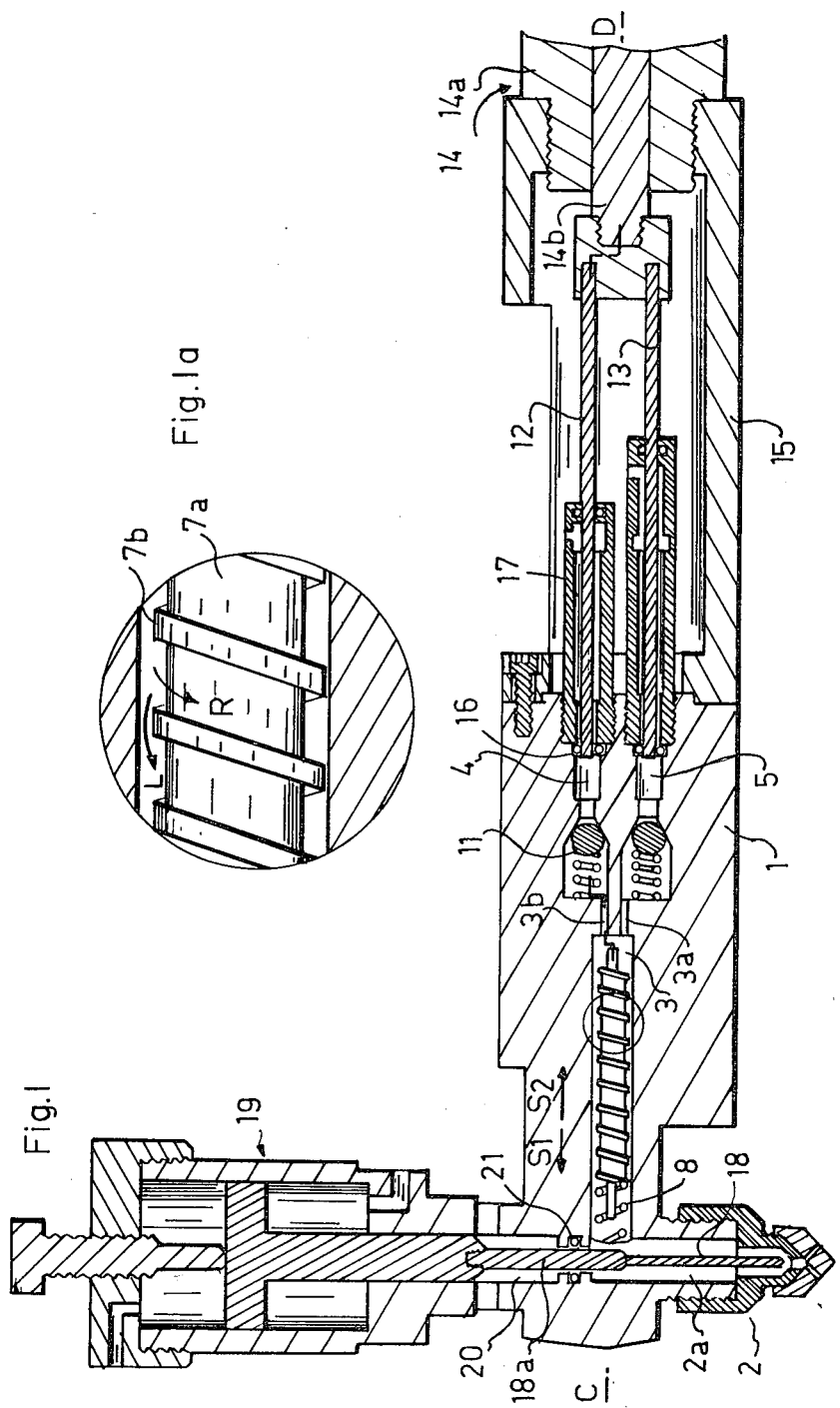

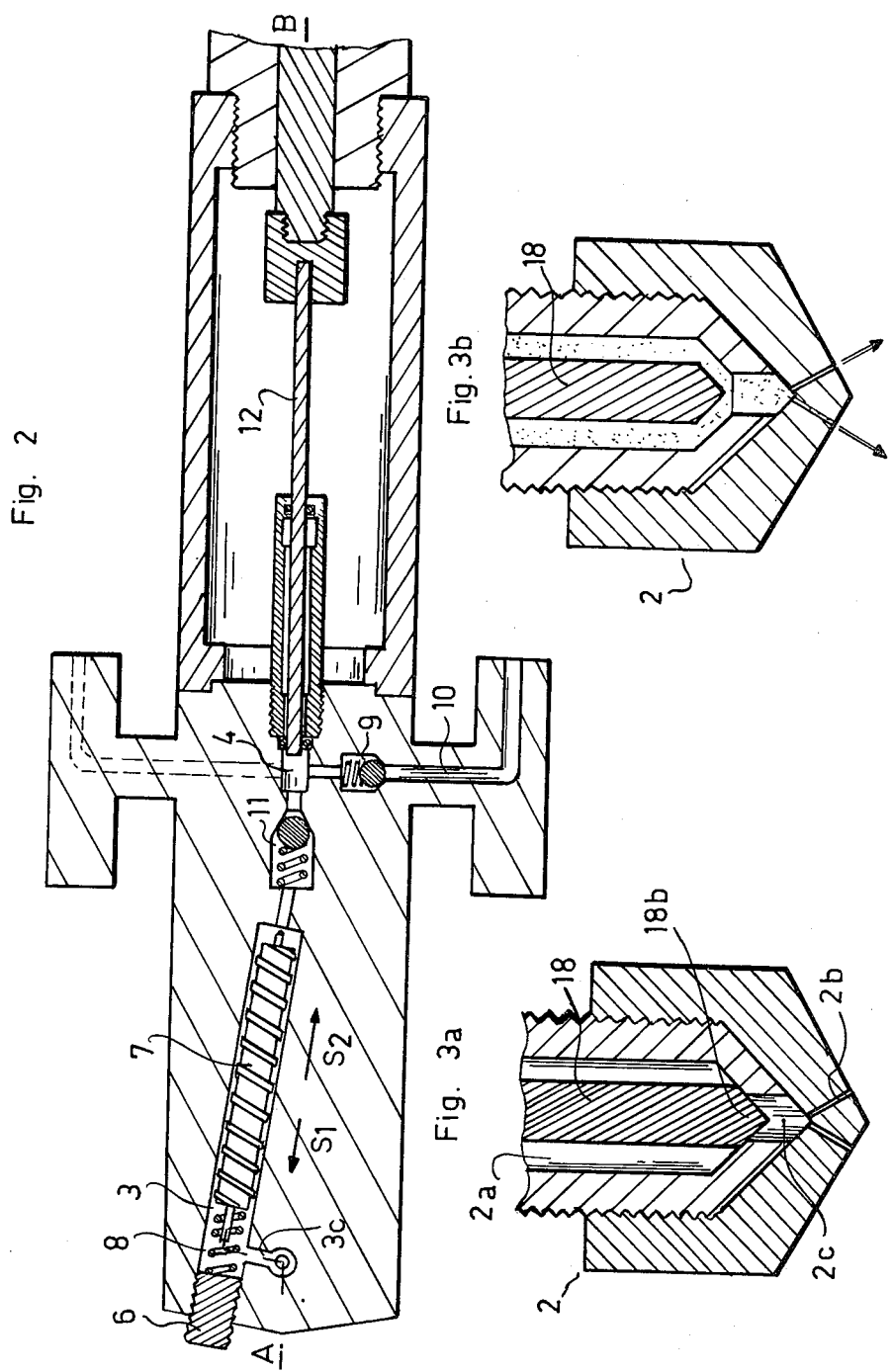

DEVICE FOR MIXING AND FOR DOSE-FEEDING A PRODUCT, AND APPLICATION TO FEEDING ESPECIALLY EPOXY-RESIN BASED ADHESIVES

The invention concerns a device for mixing and for dose-feeding a product constituted substantially by at least two components; it applies particularly to preparing and feeding hardening mixtures of the epoxy-resin based adhesive type or similar mixtures; it can also apply to other types of mixtures and where appropriate to homogenizing and feeding a single product.

It is necessary in many industrial fields to repetitively and very accurately project onto elements to be bonded doses of adhesive which sometimes are very small. This operation incurs difficulties well known to the specialists as regards simultaneously obtaining good mixing of the components so as to achieve a satisfactory grade adhesive and adequately accurate feeding to prevent soiling the adjacent areas of the parts to be bonded; furthermore it is mandatory that the mixing and feeding device can be easily and quickly cleaned between use in order to avert the adhesive from hardening in situ and clogging the various members of the device.

The devices presently extant are essentially of two kinds: dynamic devices comprising a mixing member rotationally driven by a motor to achieve mixing, and static devices wherein the mixing member is stationary, the mixing taking place by lamination when the product passes this stationary member.

The dynamic devices assume complex structures and present problems difficult to solve to assure the transmission of motion to the mixing member while preserving the hermeticity of the chamber containing this member; this is so because this chamber is filled with the hardening mixture which tends to accumulate and to adhere and harden near the seals which rapidly degrade.

The static devices are much simpler and raise no sealing problems as acute as those cited above. However the static devices which are presently known do not simultaneously permit obtaining both good mixing and good feeding accuracy. Because they operate by lamination, the stationary mixing members cause a substantial loss of material when the product is moving, the mixing improving as the material loss increases; under these conditions, and as regards the known devices, the feeding pressure downstream of the mixing chamber is too slight to achieve precise product projection at the discharge orifice.

The object of the present invention is a static-type device and to remedy the drawbacks of this type of device while preserving its qualities and advantages (simpler structure, easier-solved sealing problems, easier cleaning).

In particular an essential object of the invention is to provide a device with a static-type mixing member capable on one hand to achieve thorough mixing of the base components and on the other hand to project doses of this mixture with high accuracy and without dispersion on a target, without splashing neighboring parts.

Another object is to provide a device capable of feeding under the above cited conditions doses consisting of minute product quantities, in particular doses less than about 1 gram.

Another object is to provide a device which is especially easy to clean between uses.

Another object is to substantially improve the quality of the mixture obtained within the device while preserving projection accuracy and the above cited cleaning cap- abilities.

Another object is to provide a device very particularly designed to feed adhesives, especially epoxy resin based hardening adhesives.

Within the scope of the above described application, it is also an object of the invention to eliminate forming filaments or burrs which tend to appear at the ejection orifice after each adhesive dose has been provided, as these filaments or burrs may degrade the feed accuracy of the next dose.

Another object of the invention within the scope of the same application is to provide a satisfactory solution to the sealing problems caused by the presence of an adhesive and hardening mixture.

To that end, the mixing and dose-feed device object of the invention is of the type which comprises an intake chamber for each component, feed means providing the considered component to each intake chamber, a mixing chamber comprising on one side inlets connected to the intake chambers and on the other side a mixture discharge means, pressurization means designed to set a predetermined pressure at the mixing chamber inlets, a static type mixing member located within the mixing chamber between its inlets and discharge, an ejection nozzle communicating with the discharge of the mixing chamber and provided with at least one product ejection orifice, a sealing member associated with said nozzle to permit sealing or opening the ejection orifice(s), and control means for the sealing member which are designed to actuate it for each dose of feed-product in order to open the ejection orifice(s) for a time interval corresponding to the issue of said dose. According to the present invention, the mixing member is mounted freely within the mixing chamber so it can move within it along a predetermined path, and is associated with return means arranged to repel it in the direction ($S_2$) from the discharge to the inlets of the mixing chamber, said return means being designed to provide the mixing member with the option of moving in the opposite direction ($S_1$) under the influence of differential pressures exerted on said member when said ejection orifice(s) is (are) open.

The above mentioned return means can be constituted by an elastic member of which the Young's modulus assumes a value such that:
- on one hand said elastic member can overcome the viscous forces and return the mixing member toward the inlets of the mixing chamber when same is at a substantially uniform pressure;
- on the other hand, this member operates elastically and permits the mixing member to move when subjected to the differential pressures caused by opening the nozzle ejection orifice.

As will be better understood below, the device of the invention allows simultaneously achieving high-grade mixing of the base components and to project the obtained product with good accuracy on the elements to be bonded. The operational sequence of the device is the following:

Once a dose has been fed, the ejection orifice is reclosed by the sealing member and, under the influence of the pressurizing means, the mixing chamber and the nozzle are pressurized again: the nozzle being closed, the product pressure will statically balance between the inlets of the mixing chamber and the ejection orifice, until a value constant throughout the volume is reached, which corresponds to that exerted by the pressurizing means regardless of the material loss caused by the mixing member. This mixing member had been repelled toward the mixture discharge during the preceding feed and is now returned toward the inlets by the return means when the pressure differences exerted on it have vanished; while the product is moving, it undergoes a lamination of which the effectiveness is without constraint at all, as the mixing member can be designed in each application to provide an optimum quality mixture.

When the ejection orifice is open to feed a new dose, the ejection begins and generates a pressure drop within the nozzle; however, this pressure drop is limited by the elasticity of the return means: they will move out of the way due to the pressure differential undergone by the mixing member which is caused to move downstream in the mixing chamber (to the discharge side of the mixture), whereby the pressure is stabilized in the nozzle. This transient equilibrium depends on one hand on the pressure imparted by the pressurizing means and on the other hand on the Young's modulus of the return means, and this equilibrium value can be set as a function of each application at sufficiently high level to cause accurate projection of the product on the corresponding target. It should be noted that the displacement of the mixing member is accompanied by a draw of products from the intake chambers toward the upstream part of the mixing chamber (located on the side of the inlets) and, upon closure of the nozzle, another cycle such as described above can start.

In another feature of the invention, the mixing member preferably is arranged in the mixing chamber so it can move along a path corresponding to a free volume of said chamber at least equal to the maximum volume $V_m$ of the doses to be fed. In this manner a pressure drop in the nozzle at the end of feeding a dose will be avoided and the totality of the dose is projected at nearly constant high pressure; consequently accuracy of projection is kept up during the entire feeding.

As a rule, the mixing chamber is elongated, the mixing member itself of elongated shape being designed to achieve product lamination between its outside and the inside of the mixing chamber. In particular, the mixing chamber can assume a cylindrical form and the mixing member consisting of a cylinder with a length and diameter respectively less than the length and inside diameter of the chamber so as to permit subjecting the moving product to combined actions of longitudinal lamination and rotational lamination.

By combining these two kinds of laminations, high efficacy in mixing the product components is achieved while benefiting of a mixing member of moderate length greatly facilitating cleaning and reducing the bulk of the device.

The invention also applies to preparing and feeding in doses any product consisting of several components, whether two, three or even more. It may also be applied where called for to homogenizing and feeding a single product in doses.

As regards a two-component adhesive of the epoxy resin and catalyst type, it was found that good results are obtained at low temperatures by using pressurizing means capable of setting up a pressure roughly between 100 and 200 bars in the mixing chamber.

As the invention was described above in outline form, other features, purposes and advantages of this invention will become clear in relation to the description below and the attached drawings illustratively showing one embodiment in non-limiting form; these drawings are an integral part of the present description.

FIG. 1 is a schematic section along the broken line AB of this embodiment mode;

FIG. 2 is a schematic section along another broken line CD;

FIGS. 3a and 3b are details of one of the members of the embodiment;

Figure 4A:
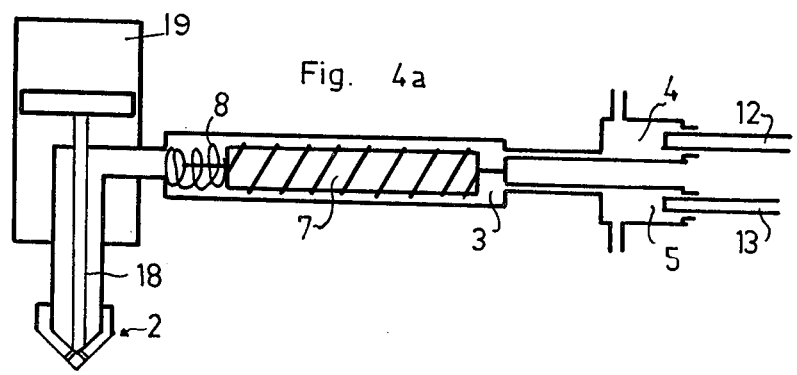
FIGS. 4a, 4b, 4c and 4d are schematics illustrating the operation of the device.

The illustratively shown device of the figures is in the form of a glue gun capable of projecting in highly accurate form small doses of epoxy resin adhesive weighing roughly from 0.1 to 0.5 g.

This device comprises a body 1 wherein the components (in the example, epoxy resin and catalyst) are mixed and a nozzle 2 rigidly joined to the body 1 and for the purpose of ejecting doses of mixture.

This body 1 comprises a cylindrical blind bore 3 forming a mixing chamber for the components. This chamber 3 communicates by two inlets 3a and 3b with two component intake chambers 4 and 5 while its other end issuing at the end of the body is closed in the extension of the chamber by a removable plug 6 and is provided with a lateral mixture discharge means 3c.

The chamber 3 contains a mixing member 7 constituted by a cylinder 7a shorter than the chamber and of a diameter less than the chamber's; this cylinder therefor can move longitudinally within the chamber along a path defining a swept-out volume larger than the volume of the doses to be fed. The cylinder 7a is provided on its outside surface with a helical rib 7b of which the outside diameter is slightly less than the bore of the chamber. In the illustration, the bore of the mixing chamber 3 can be about 10 mm, the diameter of the cylinder 7a can be about 8.65 mm and the outside diameter of the rib 7b about 9.9 mm.

The mixing member 7 is subjected to a return force generated by a spring 8 located in the downstream part of the chamber 3 and in this example being approximately 3 to 4 kg. This spring acts on the mixing member in the $S_2$ direction from downstream to upstream of the mixing chamber 3 (the direction from the discharge 3c to the inlets 3a and 3b).

The removable plug 6 sealing the chamber at its downstream end is located within its extension and provided with a diameter at least equal to the own diameter of the chamber so as to allow easy removal of the mixing member 7 and spring 8 when cleaning.

Furthermore each intake chamber 4 or 5 located upstream of the mixing chamber 3 is connected to feed means for one of the components (in the example, epoxy resin or catalyst) with interposition of a valve such as 9 arranged to prevent component return toward said feed means. These means are constituted for each component by a lateral feed channel 10 connected to a reservoir (not shown) for the component which is under moderate pressure (a few bars).

Downstream, each intake chamber 4 or 5 is provided with a valve such as 11 arranged to prevent return of the product from the mixing chamber 3.

Moreover a mobile pressurizing rod 12 or 13 enters each intake chamber 4 or 5; these rods 12 and 13 are connected to a mobile member 14b of a jack 14 with a piston of which the cross-section is much larger than that of the said rods for the purpose of achieving a pressurization multiplying effect. FIG. 1 shows the end 14a of the body of the jack 14 which is rigidly joined to a jack support 15 itself fastened to the device body 1. In the illustration, the rods 12 and 13 and the jack 14 are designed to set up a pressure of about 200 bars in each of the intake chambers 4 and 5.

Furthermore O-ring seals such as 16 are provided at the rear of the intake chambers 4 and 5 to assure hermeticity around the rods 12 and 13; it should be noted that near the intake chambers, the components as yet are not mixed and therefore evince no tendency at all to harden, whereby these seals assure hermeticity in a wholly satisfactory manner; however, to increase their life and rigorously eliminate any sealing defect, small lubricant reservoirs such as 17 crossed by the rods 12 and 13 are advantageously provided where so desired at the rear of the seals 16.

At its downstream end, the mixing chamber 3 communicates with the internal channel 2a of the nozzle 2 by means of a discharge means 3c offset with respect to the longitudinal direction of the mixing chamber.

The internal channel 2a issues at the low end of the nozzle through one or several ejection orifices of small diameter such as 2b (two in the example), which can be sealed by a mobile needle 18. This needle is moved by its upper portion 18a by a dual-effect pneumatic jack 19 permitting both to lift the needle to open the ejection orifices 2b or on the other hand to lower it to seal them.

The upper portion 18a of the needle passes through a small reservoir 20 of lubricating fluid, in particular silicone oil, of a kind suited to prevent the mixture from adhering to the needle. The internal channel 2a of the nozzle and this reservoir 20 are hermetically kept apart from each other by an O-ring seal 21; thanks to the permanent presence of the lubricant in the reservoir 20, the portion of the needle making contact with the seal 21 is constantly lubricated during the reciprocating motions; in this manner deposits of hardened products on this portion of the needle are eliminated, whereby the dangers of degradation and of premature wear of the seal 21 are considerably reduced. The hermeticity so achieved is of high grade and is retained in the course of time.

As shown by the FIGS. 3a and 3b, a small buffer chamber 2c is located between the ejection orifices 2b and the internal channel 2a of the nozzle. The needle 18 comprises a sealing end 18b of conical shape which is designed to come to rest on a seat of conjugate shape and provided at the inlet of the buffer chamber 2c.

The needle therefore seals the ejection orifices upstream of the buffer chamber 2c and, as shown by experiment, this arrangement does eliminate or substantially reduce the formation of filaments and burrs appearing at the end of a dose feed of adhesive and jeopardizing the projection accuracy of the next dose. It appears that the amount of adhesive contained in the chamber 2c forms a buffer eliminating or reducing the shrinkage phenomena which develop near the projection orifices when the needle closes these orifices directly.

The device of the invention, in a manner known per se, terminates in a hot fluid circuit (omitted) passing through the body 1 and near the intake chambers 4 and 5 and the mixing chamber 3; moreover the device comprises inlets for the cleaning liquid and for compressed air which permit during cleaning (after closing the component feed reservoirs) to supply these fluids to all the members that were in contact with the components or with the mixture.

The operation of the device is illustrated schematically in FIGS. 4a, 4b, 4c and 4d.

For the case of an epoxy resin based adhesive, the components, the epoxy resin and the catalyst, may be incoming at an approximate temperature of 45° C., while a liquid heated to about 45° passes through the fluid circuit to keep the mixture at this temperature.

An operational cycle is described below, assuming that at its beginning the device is in the state of FIG. 4a. The nozzle 2 is closed and the mixing member 7 is located in the upstream direction under the effect of the spring 8. A uniform static pressure of about 200 bars prevails in the intake chambers 4, 5, in the mixing chamber 3 and in the nozzle 2. This pressure is set up by the rods 12 and 13 which compress the components; these components being practically incompressible, the rods 12 and 13 will be near their rear position.

Figure 4B:
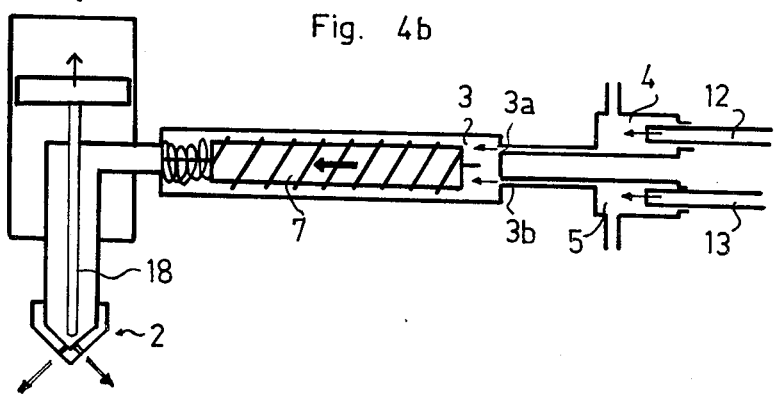
Figure 4C:
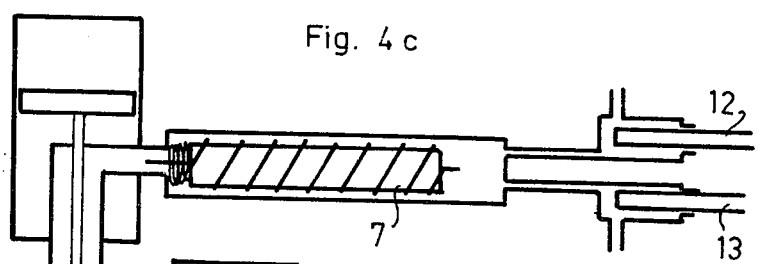
Figure 4D:
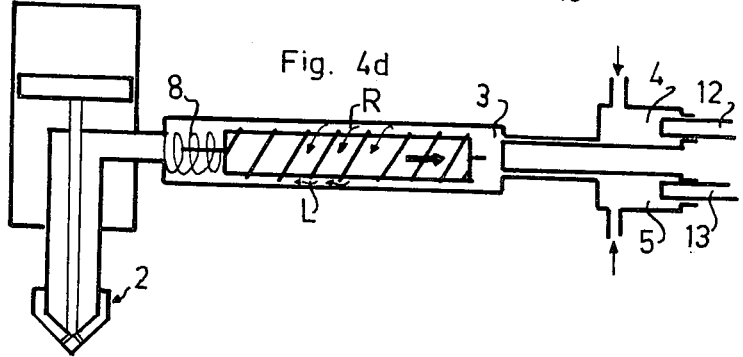

At a given time, the pneumatic jack 19 lifts the needle 18 and opens the nozzle 2; due to the high pressure, adhesive projection starts and is directed with high accuracy along the axes of the two orifices of projection and without substantial dispersion about these directions. The pressure in the nozzle 2 tends to drop while staying at a high value in view of the initial pressure level (exceeding 150 bars). The mixing member 7 then is subjected to a pressure differential compensating the return forces and causing the displacement of this member in the downstream direction (FIG. 4b).

Obviously the set of phenomena described above occurs within an extremely short time. During the motion of the mixing member 7, the pressure stabilizes in the nozzle 2 and the projection of the adhesive proceeds and terminates at high pressure, while the components are drawn through the inlets 3a and 3b of the mixing chamber (the rods 12 and 13 advance simultaneously with the flow of the components maintaining the pressure near the intake chambers 4 and 5 and the inlets of the mixing chamber 3 at 200 bars).

At the time the nozzle 2 closes again following the projection of all the adhesive dose (FIG. 4c), the mixing member 7 is near its forward position and in the course of its displacement swept through a volume which is equal to that of the fed dose, thereby avoiding a pressure drop at the nozzle 2; thus the adhesive dose was fed as a whole under high pressure.

Once the nozzle 2 closes again, the rods 12 and 13 are moved to the rear, thereby drawing components from the feed reservoirs toward the intake chambers 4 and 5; the jack then is pressurized again to re-establish the high pressure of 200 bars at the intake chambers 4 and 5 and at the inlets 3a, 3b of the mixing chamber 3, this static pressure stabilizing nearly instantaneously in the entire mixing chamber 3 and in the nozzle 2.

The mixing member 7 no longer is subjected to the return force from the spring 8 and moves to the rear (FIG. 4d); as the material passes by, this mixing member 7 achieves a dual lamination of the product, on one hand a longitudinal lamination L between the outer rim of the helical rib 7b and the wall of the chamber 3, and on the other hand a rotational lamination R in the space bounded between the helical turns. This double lamination provides an extremely effective mixing action whereby a relatively short mixing member (with a length of about 7 to 8 cm in the example described) is capable of providing at the discharge 3c of the mixing chamber a homogeneous product constituting a high grade adhesive.

At the end of each time of use, a cleaning cycle is performed. Following unscrewing of the plug 6, the mixing member 7 can be easily withdrawn to be cleaned by itself; its removal facilitates the circulation of the cleaning liquid through the entire device.

Obviously the invention is not restricted to the terms of the above description but comprises all variations. In particular, as regards a device to be used in a fixed position, the return force exerted on the mixing member might be gravitational, the mixing chamber being arranged vertically or at a high slope with a mixing member of a suitable weight.

I claim:

1. A device for mixing and dose-feeding a product comprising a plurality of components, said device comprising an intake chamber (4,5) for each said component, means for feeding each said intake chamber with a component under pressure, a mixing chamber (3) having inlet passages (3a,3b) in communication with each said intake chamber and a mixture discharge passage (3c), a mixing member (7) in said mixing chamber between said inlet passages and said discharge passage, an ejection nozzle (2) In communication with said discharge passage and having at least one product ejection orifice (2b), a sealing member (18) for sealing or opening said orifice, control means for opening said sealing member for a time interval for enabling the discharge of a dose of said product, said mixing member being mounted in said mixing chamber so as to be freely movable therein along a predetermined path in response to pressure changes and having means for urging said mixing member away from said discharge passage and toward said inlet passages, whereby said mixing member is movable toward and away from said discharge passage in response to the pressures exerted on said mixing member when said orifice is open or closed.

2. A mixing and feeding device as in claim 1 and including means for pressurizing each said intake chamber comprising a piston rod (12, 13) entering each intake chamber and connected to a piston, and each said intake chamber including first valve means (9) upstream of said piston for preventing the return of a component to the outside of the device and second valve (11) downstream of said piston for preventing a return of a component into the mixing chamber.

3. A mixing and feeding device as in claim 1 and wherein said product comprises an adhesive and wherein said components react to form said product.

4. A mixing and feeding device as in claim 3 and wherein said adhesive is an epoxy resin adhesive and said components comprise a resin and a catalyst for forming said epoxy resin adhesive, and wherein said device includes means for generating a pressure of about 100 to about 300 bars in said mixing chamber.

5. A device for mixing and dose-feeding as in claim 1 and wherein said mixing member (7) is arranged in the mixing chamber (3) so as to be movable along a path corresponding to a free volume of said chamber at least equal to the maximum volume ($V_m$) of the doses to be fed.

6. A device for mixing and dose-feeding as in claim 1 and wherein the mixing chamber (3) is of elongated shape, and said mixing member is of a corresponding elongated shape for achieving product lamination between its outside surface and the inside of the mixing chamber.

7. A mixing and feeding device as in claim wherein the mixing chamber (3) has a cylindrical shape, and wherein said mixing member (7) comprises a cylinder (7a) having both a length and a diameter respectively less than the length and the inside diameter of the mixing chamber (3) and having on its surface at least one helical rib (7b) of which the outside diameter is slightly less than the inside diameter of the chamber (3) so as to subject the passing product to the combined actions of longitudinal lamination (L) and rotational lamination (R).

8. A mixing and feeding device as in claim 1, and wherein said urging means associated with the mixing chamber (3) comprises an elastic member (8) located within the mixing chamber (3) for acting on the mixing member (7), said elastic member being capable of overcoming the viscous forces and return the mixing member (7) toward the inlet passages (3a, 3b) of the mixing chamber when a substantially uniform pressure prevails within said mixing chamber (3), and having sufficient resiliency to permit a displacement of the mixing member (7) when said mixing member is subjected to the differential pressure caused by opening the ejection orifice (2b) of the nozzle.

9. A mixing and feeding device as in claim 1 and including a product passage communicating said mixture discharge passage with said nozzle, and wherein the sealing member comprises a movable needle (18) in said product passage, said needle (18) comprising a sealing end (18b) located opposite the ejection orifice (2b) and an actuating portion (18a), said device further comprising a reservoir (20) containing a lubricating fluid for preventing the mixture from adhering to the needle, said actuating portion passing through said reservoir.

10. A mixing and feeding device as in claim 1 and including a product passage communicating said mixture discharge passage with said nozzle, and a buffer chamber (2c) in said nozzle, and wherein the sealing member comprises a movable needle located in said product passage for sealing said orifice upstream of said buffer chamber (2c).

11. A mixing and feeding device as in claim 1 and wherein the mixing chamber (3) comprises a cylindrical blind bore closed by a removable plug, said discharge passage being laterally offset from the longitudinal axis of said chamber (3).

* * * * *